United States Patent
Kurokawa et al.

(10) Patent No.: US 7,663,985 B2
(45) Date of Patent: Feb. 16, 2010

(54) INFORMATION RECORDING AND REPRODUCTION METHOD AND INFORMATION RECORDING AND REPRODUCTION DEVICE

(75) Inventors: Takahiro Kurokawa, Fujisawa (JP); Hiromi Kudo, Chigasaki (JP); Harukazu Miyamoto, Higashimurayama (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 639 days.

(21) Appl. No.: 11/333,583

(22) Filed: Jan. 18, 2006

(65) Prior Publication Data

US 2007/0064552 A1 Mar. 22, 2007

(30) Foreign Application Priority Data

Sep. 21, 2005 (JP) ............................ 2005-274199

(51) Int. Cl.
G11B 7/00 (2006.01)
(52) U.S. Cl. ................................ 369/44.23; 369/53.35
(58) Field of Classification Search ............. 369/53.34, 369/44.23, 53.35
See application file for complete search history.

(56) References Cited

U.S. PATENT DOCUMENTS

| 5,627,807 | A * | 5/1997 | Abe ........................ 369/44.29 |
| 6,278,670 | B1 * | 8/2001 | Hayashi et al. .......... 369/44.41 |
| 7,164,638 | B2 * | 1/2007 | Wada et al. .............. 369/53.19 |
| 2001/0028614 | A1 | 10/2001 | Furukawa |
| 2002/0176331 | A1 * | 11/2002 | Ariyoshi et al. ......... 369/44.23 |
| 2003/0099168 | A1 * | 5/2003 | Ma et al. ................. 369/44.13 |
| 2003/0107961 | A1 | 6/2003 | Yasuda et al. |
| 2003/0147332 | A1 | 8/2003 | Ichimura et al. |
| 2004/0017743 | A1 * | 1/2004 | Sasaki et al. ............. 369/44.32 |
| 2004/0218484 | A1 * | 11/2004 | Kuze et al. ............... 369/44.23 |
| 2005/0047291 | A1 * | 3/2005 | Kuze et al. ............... 369/44.32 |
| 2005/0052964 | A1 | 3/2005 | Fujita et al. |
| 2005/0063259 | A1 | 3/2005 | Isshiki et al. |
| 2005/0237873 | A1 * | 10/2005 | Maruyama et al. ....... 369/44.23 |

FOREIGN PATENT DOCUMENTS

| EP | 1575039 | 9/2005 |
| JP | 2000-011388 | 1/2000 |
| JP | 2001-222838 | 8/2001 |
| JP | 2003-168225 | 6/2003 |
| JP | 2003-233917 | 8/2003 |

(Continued)

OTHER PUBLICATIONS

Jpn. J. Appl. Phys. vol. 38 (1999) pp. 1715-1719, Part 1, No. 3B Mar. 1999.

*Primary Examiner*—Wayne R Young
*Assistant Examiner*—Thomas D Alunkal
(74) *Attorney, Agent, or Firm*—Antonelli, Terry, Stout & Kraus, LLP.

(57) ABSTRACT

The focus offset FE0 corresponding to minimum jitter is learned in advance. When performing spherical aberration adjustment for each disk, the spherical aberration is adjusted so that the jitter reaches a minimum, while maintaining the focus offset at FE0. The invention provides a method for performing high-precision adjustment of the focus offset and spherical aberration, even in the case of a disk which does not have data recorded on it.

8 Claims, 8 Drawing Sheets

FOREIGN PATENT DOCUMENTS

| | | |
|---|---|---|
| JP | 2004-95106 | 3/2004 |
| JP | 2004-171630 | 6/2004 |
| JP | 2004-241081 | 8/2004 |
| JP | 2004-241102 | 8/2004 |
| JP | 2005-85311 | 3/2005 |
| JP | 2005-100483 | 4/2005 |

* cited by examiner

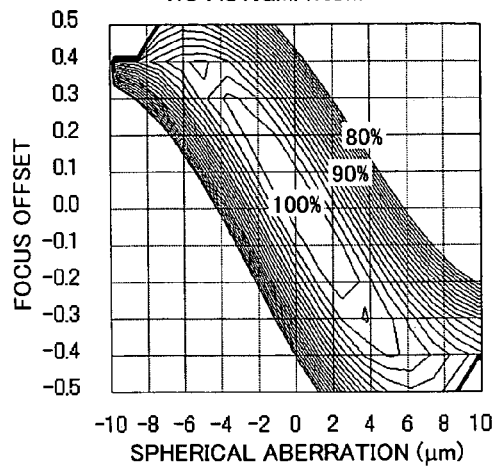
FIG. 1 A  NO ASTIGMATISM
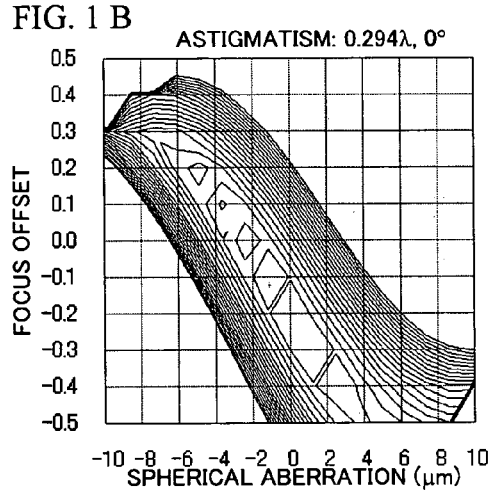
FIG. 1 B  ASTIGMATISM: 0.294λ, 0°
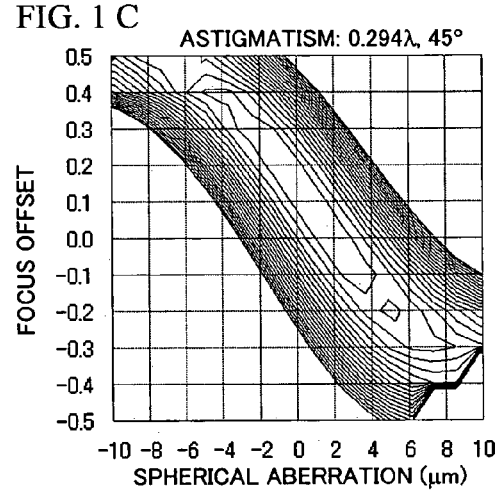
FIG. 1 C  ASTIGMATISM: 0.294λ, 45°
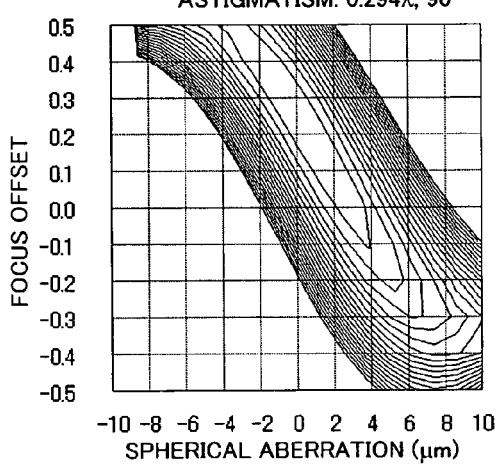
FIG. 1 D  ASTIGMATISM: 0.294λ, 90°
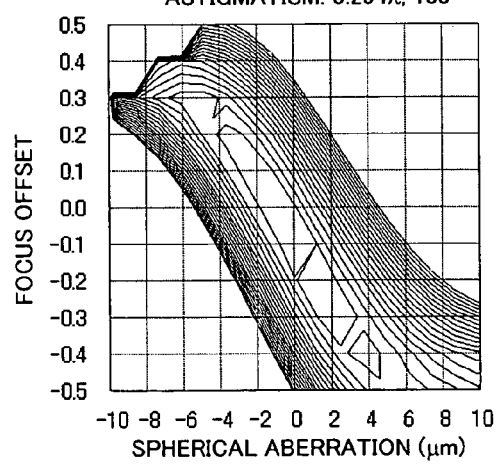
FIG. 1 E  ASTIGMATISM: 0.294λ, 135°

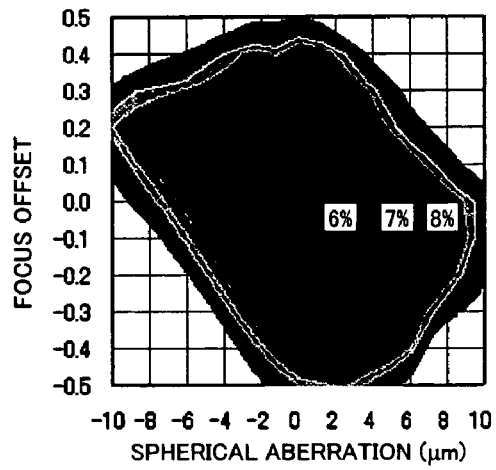
FIG. 2 A  NO ASTIGMATISM
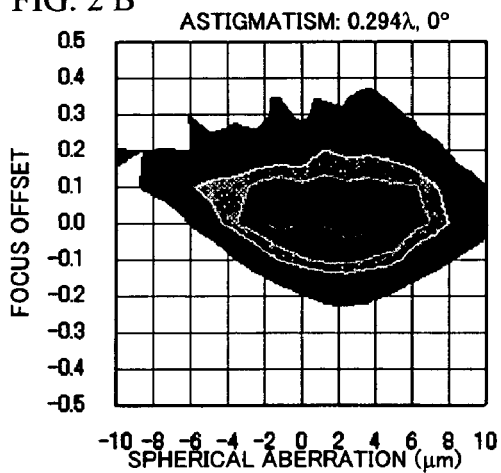
FIG. 2 B  ASTIGMATISM: 0.294λ, 0°
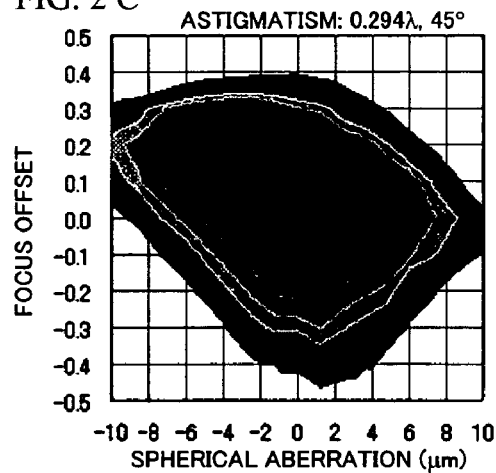
FIG. 2 C  ASTIGMATISM: 0.294λ, 45°
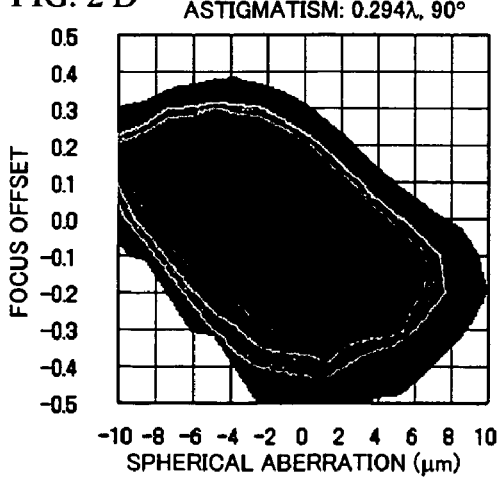
FIG. 2 D  ASTIGMATISM: 0.294λ, 90°
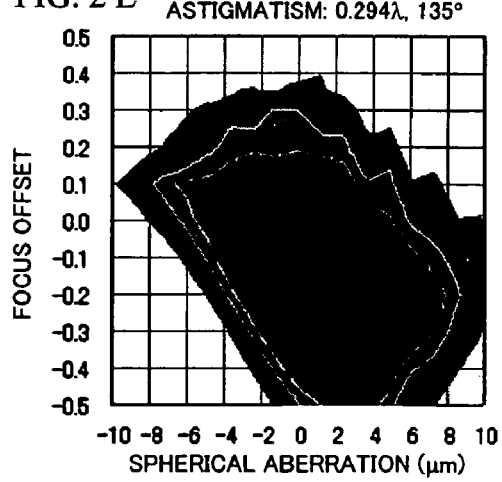
FIG. 2 E  ASTIGMATISM: 0.294λ, 135°

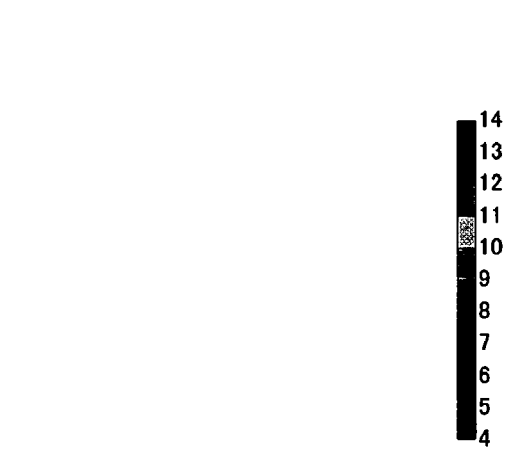
FIG. 3 A  NO ASTIGMATISM
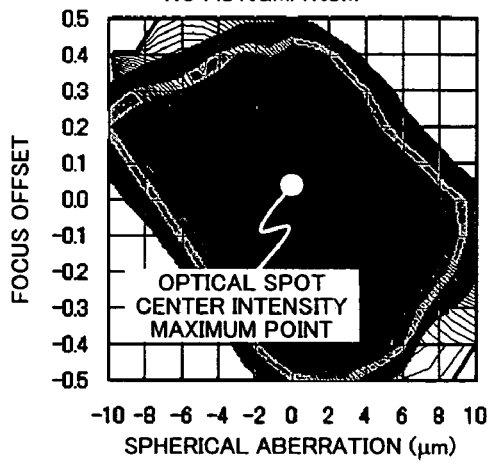
FIG. 3 B  ASTIGMATISM: 0.294λ, 0°
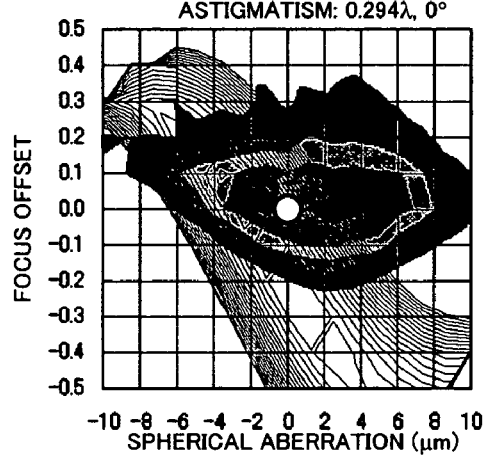
FIG. 3 C  ASTIGMATISM: 0.294λ, 45°
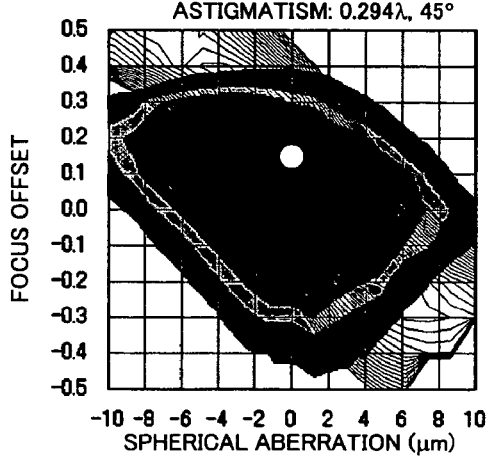
FIG. 3 D  ASTIGMATISM: 0.294λ, 90°
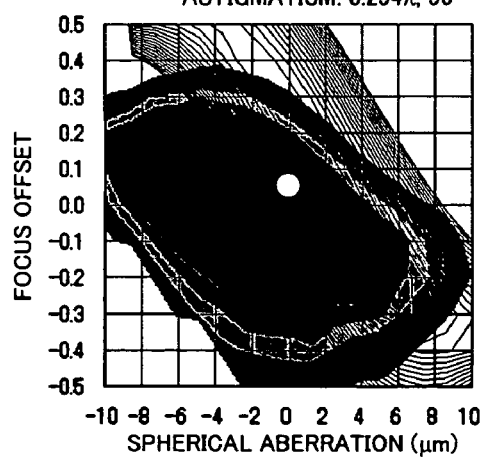
FIG. 3 E  ASTIGMATISM: 0.294λ, 135°
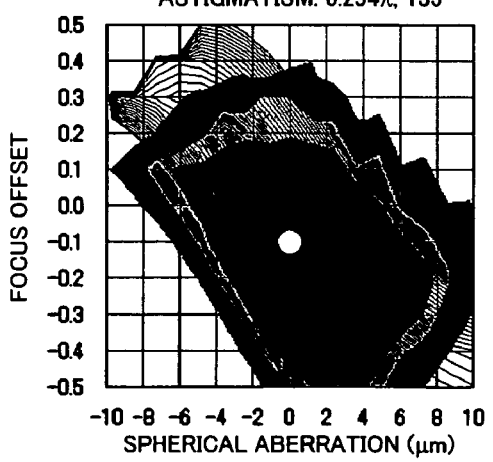

INFORMATION RECORDING AND REPRODUCTION METHOD AND INFORMATION RECORDING AND REPRODUCTION DEVICE

CLAIM OF PRIORITY

The present application claims priority from Japanese application JP 2005-274199 filed on Sep. 21, 2005, the content of which is hereby incorporated by reference into this application.

FIELD OF THE INVENTION

The present invention relates to an information recording and reproduction method and an information recording and reproduction device that performs recording or reproduction of information by light irradiation, which makes it possible to appropriately adjust the focus offset and spherical aberration to enable information to be recorded or reproduced without error.

BACKGROUND OF THE INVENTION

Optical disks commonly known as CDs, DVDs and the like have become widespread and are popular with consumers as high-capacity, low-price information recording media capable of random access. Recently, accompanying the increasing sophistication of personal computers and audio-visual devices, the amount of information handled by users has increased dramatically, and optical disks, as high-capacity information recording media, need to increase their capacity even more in response.

Recording onto an optical disk is performed by focusing laser light with an objective lens to form optical spots on the recording medium, and forming recording marks on the information recording surface according to the optical spots. Further, information is reproduced by detecting, with optical spots, the difference in reflectance between the recording marks and other parts.

In this way, since information is recorded and reproduced on an optical disk using optical spots, the recording density of information is restricted by the size of the optical spots. Consequently, by reducing the size of optical spots, the information recording density of optical disks can be improved, and the recording capacity per disk can be increased. The diameter of an optical spot formed on the information recording surface is known to be proportionate to $\lambda/NA$, where $\lambda$ is the laser light wavelength, and NA is the objective lens numerical aperture. Therefore, effective ways to improve the information recording density of an optical disk are to shorten the laser light wavelength and increase the numerical aperture of the objective lens.

Recently a high density optical disk having a recording capacity of approximately 25 GB per information recording surface has been developed by applying technology for reducing optical spots, using a blue laser diode of wavelength $\lambda=405$ nm and an objective lens having numerical aperture NA=0.85, instead of the red laser diode of $\lambda=650$ nm and objective lens with NA=0.6 that had been used in DVDs (recording capacity=4.7 GB per information recording surface).

Adjustment of the distance between the information recording surface and the focal point on the optical disk is performed by altering the target position of the focus servo. By controlling the focal point position so that the focus error signal becomes zero, the focus servo constantly makes the focal point follow the recording surface. In order to adjust the distance between the recording surface and the focal point, an offset (focus offset) is added to the focus error signal. Accordingly, by altering the target position of the focus servo, the average distance between the recording surface and the focal point can be adjusted.

However, increasing the NA of the objective lens in order to increase recording density gives rise to the problem of optical spot distortion due to spherical aberration. Since the spherical aberration is approximately proportional to $NA^4 \times d$, where d is the disk cover layer thickness error, in an optical disk system using a high NA objective lens, a large spherical aberration occurs by even a slight cover layer thickness error, causing readout signal quality to deteriorate markedly. Therefore, in the disk manufacturing process it was necessary to control the cover layer thickness with higher precision than in the case of conventional DVDs and the like, and this gave rise to issues of increasing manufacturing costs.

For the above-mentioned reasons, in the case of an optical disk system using a high NA objective lens, it is not sufficient simply to adjust the focus offset as in conventional DVDs, and a means to correct the spherical aberration in order to deal with cover layer thickness error for each disk is also essential.

Technology for correcting spherical aberration is used whereby in the optical system of an optical pickup, a spherical aberration compensation means is provided in the laser light path, and by adding a prescribed amount of spherical aberration to the light beams passing through, the spherical aberration generated by the disk cover layer thickness error when light is focused onto the recording surface by an objective lens, and the spherical aberration added in advance by-the spherical aberration compensation means cancel each other out. As a spherical aberration compensation means used in this way, (1) a spherical aberration compensation means that comprises a 2-group objective lens, which alters the distance between each objective lens using an actuator, and (2) a spherical aberration compensation means that comprises liquid crystal elements split into a plurality of regions, which controls the refractive index of each region by applying a voltage, and other such means are known, and are described in Patent documents 1 and 2, for example.

There are various commonly known examples of indices for determining the spherical aberration to be applied in advance by the spherical aberration compensation means (hereinafter simply referred to as "spherical aberration"). For example, using the technology described in Patent document 1, adjustment of the focus offset and spherical aberration is performed according to the variation of the readout signal (RF signal) amplitude obtained when reproducing data recorded on the disk. However, with respect to a disk that does not have any data recorded (no recording marks), in other words a blank disk, even if one tried to optimize the focus offset and spherical aberration, since a readout signal cannot be obtained, this could not be performed.

Further, since the technology described in Patent document 2 also performs adjustment of the focus offset and spherical aberration using the data readout signal amplitude or both the data readout signal amplitude and the tracking error signal amplitude, there must be some data recorded on the information recording surface of the optical disk. In other words, this was still problematic in that if the optical disk did not have any data recorded on it, the necessary readout signal could not be obtained, and adjustment of the spherical aberration could not be achieved.

As technology to resolve this problem, technology for performing adjustments of the focus offset and spherical aberration based on the tracking error signal or wobble signal, which can be obtained even from a blank disk, is known, and described in the following patent documents for example.

[Patent document 1] JP-A No. 11388/2000
[Patent document 2] JP-A No. 222838/2001
[Patent document 3] JP-A No. 233917/2003
[Patent document 4] JP-A No. 168225/2003
[Patent document 5] JP-A No. 171630/2004
[Patent document 6] JP-A No. 241081/2004
[Patent document 7] JP-A No. 241102/2004

SUMMARY OF THE INVENTION

FIGS. 1A to 1E show the contour lines of the tracking error signal amplitude, calculated using an optical diffraction simulator when the focus offset and spherical aberration were altered. Here, the tracking error signal refers to the push-pull signal. The tracking error signal amplitude is normalized by its maximum value, and the contour lines show intervals of 1%, with the outermost circumference showing 80%.

The size of the focus offset is normalized by the focus error signal amplitude (0–p). Further, for convenience, the size of the spherical aberration is shown converted into the disk cover layer thickness error (unit: μm). Hereinafter, the size of the focus error and spherical aberration shall be expressed in these terms.

As calculation conditions, we divided cases into those without astigmatism in the optical system (FIG. 1A), and those with 0.294 λ (0.06 λrms) astigmatism. Further, regarding cases with astigmatism, we divided them into 4 types according to the direction of astigmatism: 0°, 45°, 90°, and 135° (FIGS. 1B to 1E). We defined the direction of astigmatism with 0° as the recording track direction that an optical spot extends toward when the objective lens has moved to the side close to the disk (in focus). Table 1 shows the parameters used in calculations.

TABLE 1

| Parameters used in calculations | |
|---|---|
| Laser wavelength | 405 nm |
| Objective lens NA | 0.85 |
| Disk cover layer refractive index | 1.56 |
| Disk cover layer thickness | 100 μm |
| Track pitch | 0.32 μm |
| Track groove width | 0.16 μm |
| Track groove depth | 40.5 nm |

FIGS. 2A to 2E show the contour lines plotted after calculating the readout signal jitter when the focus offset and spherical aberration were altered, using an optical simulator and a signal processing simulator. The parameters used in the optical calculations were the same as Table 1. Jitter was defined as the standard deviation of the phase difference between the binary readout signal and the channel clock signal generated using this, normalized by the channel clock period. For the readout signal processing before calculating jitter, we performed waveform equalization with a limit equalizer. A detailed description of a limit equalizer can be found for example in S. Miyanabe et al.: Jpn. J. Appl. Phys. Vol. 38 pp. 1715.

FIGS. 3A to 3E show the contour lines of the tracking error signal amplitude in FIGS. 1A to 1E superimposed on the contour lines of the jitter in FIGS. 2A to 2E. FIGS. 3A to 3E also show the points at which the center intensity of the optical spot is at a maximum. As can be seen from FIG. 3, the distribution of the tracking error signal amplitude extends at an angle in the graph, longer than the jitter distribution. In other words, the rate of change of the tracking error signal amplitude with respect to the focus offset and spherical aberration change tends to be extremely small. Therefore, when one adjusts the focus offset and spherical aberration so that the tracking error signal amplitude reaches a maximum, since the adjustment error is large, the rate of change of the tracking error signal amplitude tends to become small. As a result, cases occurred where the jitter during reproduction of data became large.

Note that regarding an unrecorded disk, in other word a disk that does not have anything recorded on it, a procedure may be considered involving first adjusting so that the tracking error signal amplitude reaches a maximum, then recording data, and then fine tuning using the data readout signal jitter and so forth. However, for the above-mentioned reasons, it was sometimes the case that when the adjustment error was large, since the optical spot center intensity was reduced, recording power effectively declined, and adequate recording quality could not be obtained when recording, making it impossible to move to the step of fine tuning using the readout signal.

Furthermore, as is clear from FIGS. 3B and 3D, since the divergence between the point at which the tracking error signal amplitude reaches a maximum and the point at which the jitter reaches a minimum can be large, even if the focus offset and spherical aberration were adjusted so that the tracking error signal amplitude reached a maximum, it would sometimes be the case that the jitter would not decline.

Further, since individual disks vary in their disk cover layer thickness, the spherical aberration must be adjusted according to the disk, but it is thought that the focus offset does not vary so much for each disk. Notwithstanding this, by two-dimensionally adjusting focus offset and spherical aberration, as in the case of making adjustments using the tracking error signal amplitude, when the adjustment error was large, the focus offset would sometimes be made to deviate unnecessarily from the appropriate value.

Therefore, when performing aberration compensation, it is desirable to not alter the focus offset, and only adjust the spherical aberration. In order to do this it is necessary-to know the appropriate value of the focus offset in advance.

With the foregoing in view, it is an object of the present invention to provide a means to perform high-precision aberration compensation processing using the tracking error signal amplitude, in a high density optical disk using a high NA objective lens.

According to the present invention, in order to perform high-precision adjustment of the focus offset and spherical aberration with respect to various disks of differing cover layer thickness in an optical disk drive, the following learning is implemented; for example before shipment of the disk drive.

(1) With respect to the disk for adjustment containing prerecorded data, the focus offset and spherical aberration are adjusted so that the readout signal jitter reaches a minimum, and at that time the focus offset value (FE0) is stored in the disk drive memory.

(2) With respect to the same disk for adjustment as above, the difference between the spherical aberration corresponding to the minimum readout signal jitter SA0 and the spherical aberration corresponding to the maximum tracking error signal amplitude SA1 (ΔSA=SA0−SA1) is measured while maintaining the focus offset corresponding to the minimum readout signal jitter, and stored in the disk drive memory.

In order to perform aberration compensation during operation of the disk drive, the following procedure is implemented. First, the focus offset is set at FE0, and maintaining that focus offset, the spherical aberration is adjusted so that the tracking error signal amplitude reaches a maximum. Performing aberration compensation by fixing the focus offset at an appropriate value in this way solves the problem of the focus offset diverging greatly due to adjustment error.

Next, the spherical aberration is altered by ΔSA. Due to this step, the spherical aberration is adjusted so that the readout signal jitter reaches approximately a minimum. Therefore, it is possible to perform adjustment to achieve conditions of good quality reproduction, without looking at the readout signal. In addition, since under conditions of minimum jitter, the center intensity of the optical spot increases, in other words the effective recording power increases, by performing this step before recording, the quality during recording can be enhanced.

Next, recording is performed and the spherical aberration is adjusted so that the readout signal jitter reaches a minimum. When recording, data is recorded on at least three adjacent tracks, and data is also recorded on both tracks adjacent to the track for measuring jitter. The reason for this is that by creating conditions that include the influence of crosstalk from adjacent tracks, more accurate adjustment can be performed.

According to the present invention, since the appropriate focus offset and spherical aberration can be determined even for unrecorded disks, in other words disks that do not have recording marks so adjustment of the focus offset and spherical aberration cannot be performed based on the readout signal, the reliability of information recording and reproduction can be improved.

BRIEF DESCRIPTION OF THE DRAWINGS

FIGS. 1A, 1B, 1C, 1D, and 1E are figures showing the relationship between the focus offset and spherical aberration, and the tracking error signal amplitude (calculations);

FIGS. 2A, 2B, 2C, 2D, and 2E are figures showing the relationship between the focus offset and spherical aberration, and the jitter (calculations);

FIGS. 3A, 3B, 3C, 3D, and 3E are figures showing the relationship between the focus offset and spherical aberration, and the tracking error signal amplitude and jitter (calculations);

DETAILED DESCRIPTION OF THE PREFERRED EMBODIMENTS

Embodiments of the present invention are explained below with reference to the drawings.

Figure 9:
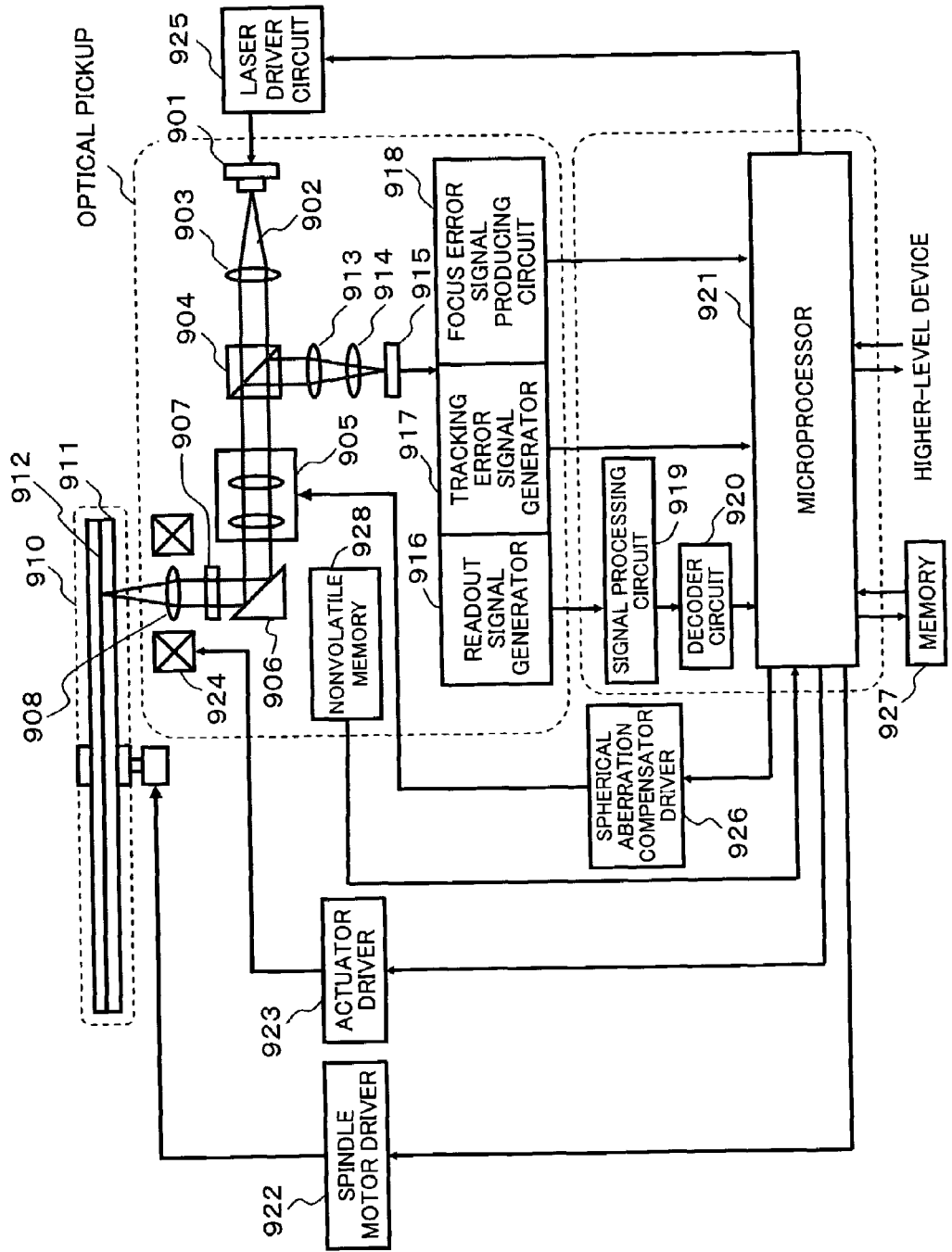
FIG. 9 is a figure showing the composition of the information recording and reproduction device according to an embodiment of the present invention.

FIG. 9 shows in frame format the composition of the information recording and reproduction device according to the present invention.

Linearly polarized laser light 902 emits from a laser diode 901, and is converted into a parallel beam by a collimator lens 903. Next, the laser light 902 passes through a polarization beam splitter 904. The polarization beam splitter 904 is arranged so as to transmit the laser light 902 being emitted by the laser diode 901 with almost no loss. The laser light 902 that has passed through the polarization beam splitter 904 has a prescribed spherical aberration added thereto by a spherical aberration compensation element 905, and is reflected on a reflection mirror 906, changing its path to the direction of an optical disk medium 910 that is being rotated by a spindle motor 909. Next, by passing through a quarter-wave plate 907, the polarization state of the laser light 902 changes from linearly polarized light to circularly polarized light. After this, the laser light 902 is focused by an objective lens 908, passes through a cover layer 911 protecting the information recording surface, and reaches the information recording surface 912, forming an optical spot thereon.

Information is recorded by focusing the laser light, which has been modulated according to the data, and irradiating the information recording surface, changing the state of the information recording surface by heat generated by the optical spots thus formed. Further, reproduction of information is performed by detecting the change in reflectivity brought about by the change in the state of the information recording surface. In the case of a read only optical disk, information is reproduced by detecting the change in reflectivity of the light caused by uneven pits, which are formed in advance on the information recording surface during the disk manufacturing process.

Figure 10:
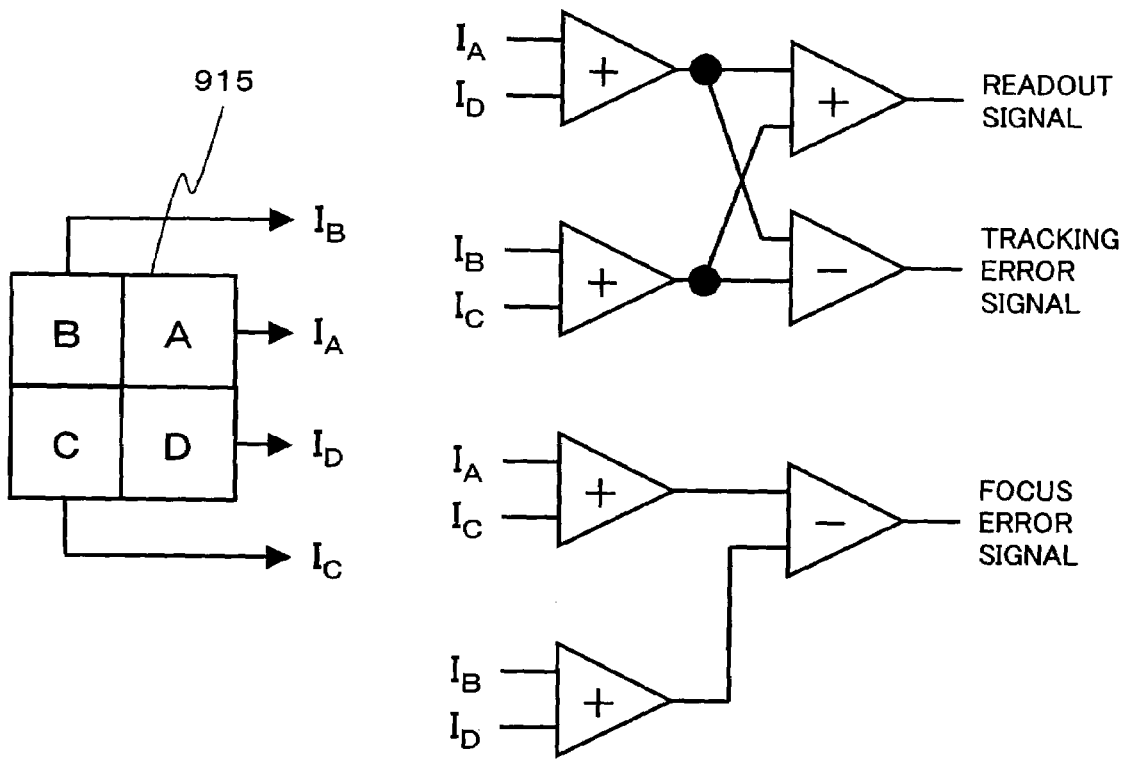
FIG. 10 is a figure showing the composition of an optical detector and a method for producing a readout signal, tracking error signal and focus error signal.

The laser light 902 reflected on the information recording surface passes through the objective lens 908, then, passing through the quarter-wave plate 907 it again reverts to linearly polarized light, further reflects on the start-up mirror 906, and heads in the direction of the polarization beam splitter 904. The laser light 902 then reflects on the polarization beam splitter 904 and changes its path to the perpendicular direction. Next, the laser light 902 is focused onto an optical detector 915 by a detection lens 913 and a cylindrical lens 914 for detecting the focus error signal. As shown in FIG. 10, the optical detector 915 is split twice along the radial direction and twice along the track direction, forming a total of four sections. Each of the divided detectors A, B, C and D outputs an output signal $I_A$, $I_B$, $I_C$, and $I_D$. Using these output signals, a readout signal, tracking error signal, and focus error signal are generated by a readout signal generator 916, a tracking signal error producing circuit 917, and a focus error signal producing circuit 918, shown in FIG. 9, according to the following formulae.

(Readout signal)=$(I_A+I_B+I_C+I_D)$ (Tracking error signal)=$(I_A+I_D)-(I_C+I_B)$ (Focus error signal)=$(I_A+I_C)-(I_B+I_D)$ The readout signal is a data signal, and after signal processing such as equalization processing has been performed in a signal processing circuit 919 shown in FIG. 9, it is converted into a binary signal in a decoder circuit 920. The binary signal is converted into data in a microprocessor 921, and is sent to a higher-level device. Further, the microprocessor 921 controls the spindle motor driver 922 and the speed of rotation of the spindle motor 909, so that the data is reproduced at the prescribed speed.

The tracking error signal is also known as a push-pull signal, and is a signal that is generated due to the displacement of an optical spot with respect to the track, in the radial direction of the disk. It is used in the tracking servo to make the optical spot follow the track. Here, the tracking servo is performed by the push-pull method. The microprocessor 921 sends a command to an actuator driver 923 based on the tracking error signal that has been sent thereto; the actuator driver 923 controls an actuator 924 based on that command, which drives the objective lens 908 along the radial direction of the disk, performing positioning.

The focus error signal is a signal that is generated due to the displacement of an optical spot with respect to the information recording surface 912 in the rotational direction of the disk, and is used in the focus servo to make the optical spot follow the information recording surface 912. Here, the focus servo is performed by the astigmatism method. The microprocessor 921 sends a command to the actuator driver 923 based on the focus error signal that has been sent thereto; the actuator driver 923 controls the actuator 924 based on that command, which drives the objective lens 908 along the rotational direction of the disk, performing positioning.

During data recording, the data sent from the higher-level device is encoded by the microprocessor 921, and a recording signal is generated. The recording signal is sent to a laser driver 925, and the laser diode is driven based on the recording signal.

Adjustment of the focus offset is performed as follows. The microprocessor 921 drives the actuator 924 by sending a command to the actuator driver, obtains the tracking error signal amplitude while sequentially altering the focus offset, and stores this in a memory 927 together with the focus offset. Using the focus offset corresponding to the maximum tracking error signal amplitude stored in the memory 927, this is set in the actuator driver 923.

Adjustment of the spherical aberration is performed as follows. The microprocessor 921 drives the spherical aberration compensation element 905 by sending a command to a spherical aberration compensator driver 926, obtains the focus error signal amplitude while sequentially altering the spherical aberration to be added to the laser light 902 (spherical aberration), and stores this in a memory 927 together with the spherical aberration. Using the spherical aberration corresponding to the maximum focus error signal amplitude stored in the memory 927, this is set in the spherical aberration compensator driver 926.

Figure 4:
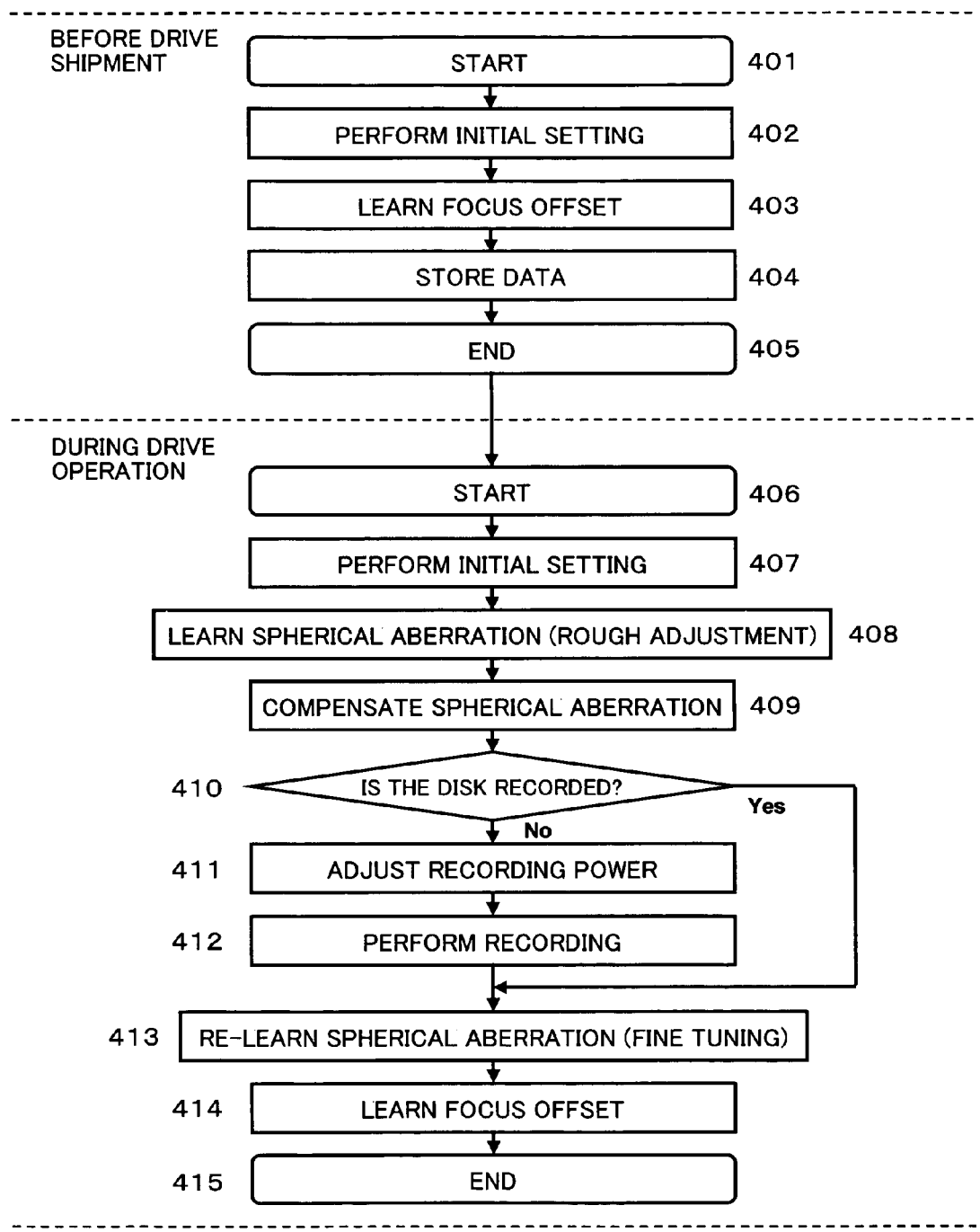
FIG. 4 is a figure showing the aberration compensation procedure according to the present invention.

An example of the focus offset and spherical aberration adjustment procedures are shown here in more detail, using the flowchart in FIG. 4. The adjustment procedures are explained separately for before shipment of the disk drive and during disk drive operation. First, the learning processing before shipment of the disk drive is explained.

(1) Step 401: Start
Learning is started.

(2) Step 402: Initial Setting
The initial value of the focus offset is set in the disk drive. The focus offset set here is zero.

(3) Step 403: Learning of Focus Offset
The disk for adjustment onto which data has been prerecorded is loaded into the disk drive, and is kept in a state whereby recording and reproduction is possible. Next, the focus offset and spherical aberration are adjusted, the condition at which the readout signal jitter reaches a minimum is searched for, and the focus offset FE0 is learnt at that time. This is done with the objective of compensating the variation in electric circuit offset and the like of each disk drive, learning an appropriate focus offset for the particular disk drive, and making it the initial value when performing adjustment during disk drive operation.

Further, while maintaining the focus offset corresponding to minimum readout signal jitter, the spherical aberration corresponding to minimum jitter SA0 and the spherical aberration corresponding to maximum tracking error signal amplitude SA1 are measured.

(4) Step 404: Storing of Head/Drive Data
The focus offset value (FE0) acquired in step 403, is stored in the disk drive memory. The value of the difference between the spherical aberration corresponding to minimum jitter SA0 and the spherical aberration corresponding to maximum tracking error signal amplitude SA1, $\Delta SA$ (=SA0−SA1) is stored in the disk drive memory.

(5) Step 405: End
Learning prior to disk drive shipment is complete.
Next, learning processing during disk drive operation will be explained.

(6) Step 406: Start
Learning is started.

(7) Step 407: Initial Setting
The initial setting of the focus offset and spherical aberration is performed. The focus offset stored in the disk drive memory in step 404 (FE0) is read and this value is used for the focus offset. For the spherical aberration, an appropriate value is set with respect to the design center value of the disk cover layer thickness.

(8) Step 408: Learning of Spherical Aberration (Rough Adjustment)
Keeping the focus offset at FE0, the spherical aberration is scanned and adjusted so that the tracking error signal amplitude reaches a maximum. The spherical aberration at this time is SA1.

(9) Step 409: Spherical Aberration Compensation
The difference between spherical aberrations ($\Delta SA$) stored in the disk drive memory in step 404 is read, and the spherical aberration is shifted by this amount multiplied by a prescribed value $\alpha$ ($\alpha \times \Delta SA$), where $0 \leq \alpha \leq 1$. In this case, when the spherical aberration is shifted, since the tracking error signal amplitude becomes small, $\alpha$ is decided balancing the stability of the tracking servo and the readout signal quality.

In this step, the spherical aberration can be set at the value corresponding to when the jitter is almost at a minimum. Further, as can be seen from FIG. 3, the point at which the jitter reaches a minimum is close to the point at which the optical spot center intensity is at a maximum. Therefore, even if the divergence between the spherical aberration corresponding to minimum jitter and the spherical aberration corresponding to maximum tracking error signal amplitude is large, a decline in the effective recording power can be prevented, and good recording quality can be obtained in the subsequent recording step 412. Note that this step may be omitted.

(10) Step 410: Recorded/Unrecorded Distinction

It is distinguished whether or not data has already been recorded on the relevant disk or not. If data has been recorded, "Yes" (step 413) is chosen and spherical aberration learning (fine tuning) is performed using the recorded data readout signal. If there is no data recorded, "No" (step 411) is chosen and the recording mark used for spherical aberration learning (fine tuning) is recorded.

Note that even if data has been recorded, step 411 may still be chosen and new data recorded.

(11) Step 411: Recording Power Adjustment

Recording power is adjusted in order to obtain good recording quality. A field especially for adjusting recording power is used. This step aims to compensate for cases where, for some reason, adequate recording quality cannot be obtained, by adjusting the recording power. Note that this step may be omitted.

(12) Step 412: Recording

Data is recorded onto the disk. During this time, data is recorded on at least three consecutive tracks. The reason for this is that when adjusting the spherical aberration based on the readout signal jitter in the subsequent spherical aberration learning step 413, by including the influence of crosstalk from adjacent tracks, more accurate adjustment can be performed.

(13) Step 413: Learning of Spherical Aberration (Fine Tuning)

The spherical aberration is adjusted so that the readout signal jitter in the track which, of the recorded tracks created in step 412, has both adjacent recording tracks already recorded, reaches a minimum.

(14) Step 414: Learning of Focus Offset

The focus offset is adjusted so that the jitter reaches a minimum, while maintaining the spherical aberration. This step is performed to compensate for the case where the appropriate focus offset has deviated from the value learned in step 403.

(15) Step 415: End

Learning is completed.

According to the above procedure, high-precision adjustment of the focus offset and spherical aberration is possible, even with respect to an unrecorded disk.

In the above-mentioned embodiment, there is a step of adjusting the focus offset and the spherical aberration so that the readout signal jitter reaches a minimum, but it is possible to adjust the focus offset and the spherical aberration so that the readout signal amplitude reaches a maximum instead.

According to the above-mentioned embodiment, tracking servo is performed using the push-pull method, but other methods may also be used. For example, tracking servo may be performed using the differential push-pull method. In that case, a diffraction grating for splitting laser light beams into three: a main beam and two sub-beams, is provided in the light path, and an optical detector exclusively for sub-beams is newly provided, enabling a push-pull signal to be obtained with respect to the sub-beams.

Further, tracking servo may also be performed using the differential phase detection (DPD) method with respect to a read only disk. However, in this case, a tracking error signal generated either from a push-pull signal or a differential push-pull signal is used in aberration learning processing performed according to the tracking error signal amplitude.

According to the above-mentioned embodiment, focus servo is performed using the astigmatism method, but other methods may also be used. For example, focus servo may be performed using the knife edge method or the spot size detection method. In such a case, it is necessary to newly provide an optical detector for obtaining the focus error signal.

Next the results of an experiment conducted to verify the effects of the aberration compensation method according to the present invention will be shown. In this experiment, we adjusted the focus offset and the spherical aberration following the procedure of the aberration compensation method according to the present invention. The following describes the procedure and results.

The focus offset is shown below in a form normalized by a 0–p value of an S-curve signal. The spherical aberration is shown in a form with the aberration converted into the disk cover layer thickness displacement (unit: μm). These values are relative values with the initial value as the point of origin.

(1) Step 01: Start

We started learning.

(2) Step 02: Initial Settings

We loaded a new disk into the disk drive and performed each initial setting.

(3) Step 03: Focus Offset Learning

We carefully altered the focus offset and spherical aberration two-dimensionally, so that the readout signal jitter reached a minimum. The focus offset FE0 at this time was FE0=0.0.

Further, maintaining the focus offset FE0 (=0.0), we measured the difference $\Delta SA$ between the spherical aberration corresponding to minimum readout signal jitter and the spherical aberration corresponding to maximum tracking error signal amplitude, and found it to be $\Delta SA=-1.0$ μm).

(4) Step 04: Storing Data

We stored the focus offset FE0 value (=0.0) and the spherical aberration difference $\Delta SA$ obtained in step 03 in the disk drive memory.

(5) Step 05: End

We completed learning.

Next, we installed the adjusted pickup into the disk drive. The following are the steps we performed for aberration compensation during operation of the disk drive.

(6) Step 06: Start

We began adjustment.

(7) Step 07: Initial Settings

We set the focus offset as FE0 (=0.0).

(8) Step 08: Spherical Aberration Compensation (Rough Adjustment)

Figure 5:
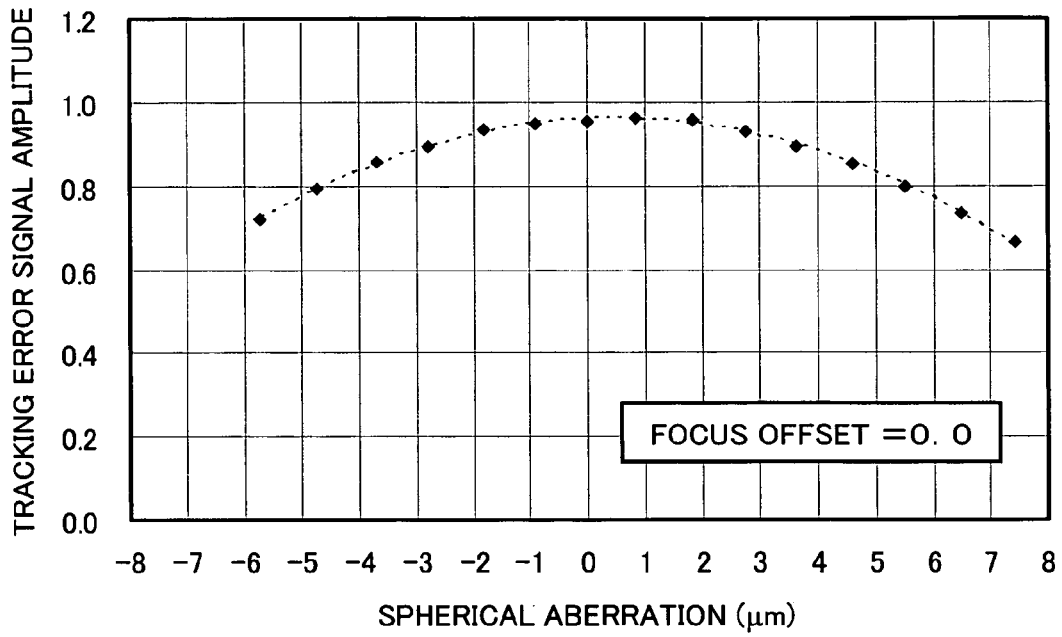
FIG. 5 is a figure showing the relationship between the spherical aberration and the tracking error signal (experiment)

We measured the tracking error signal amplitude while altering the spherical aberration, maintaining the focus offset. The results are shown on the graph in FIG. 5. According to these measurement results, we selected and set +0.85 μm as the spherical aberration corresponding to the maximum tracking error signal amplitude.

(9) Step 09: Spherical Aberration Shift

We altered the spherical aberration by $\Delta SA$ (=−1.0 μm).

(10) Step 10: Recorded/Unrecorded Distinction

We distinguished whether data had been recorded onto the disk or not.

(11) Step 11: Adjustment of Recording Power

We performed recording while altering the recording power in the region for recording power adjustment on the disk; we measured the degree of modulation of the readout signal, and selected and set the recording power giving the desired modulation.

(12) Step 12: Recording

We recorded the data onto the disk. In this step, we recorded data with respect to 5 successive recording tracks.

(13) Step 13: Second time Spherical Aberration Compensation (Fine Tuning)

Figure 6:
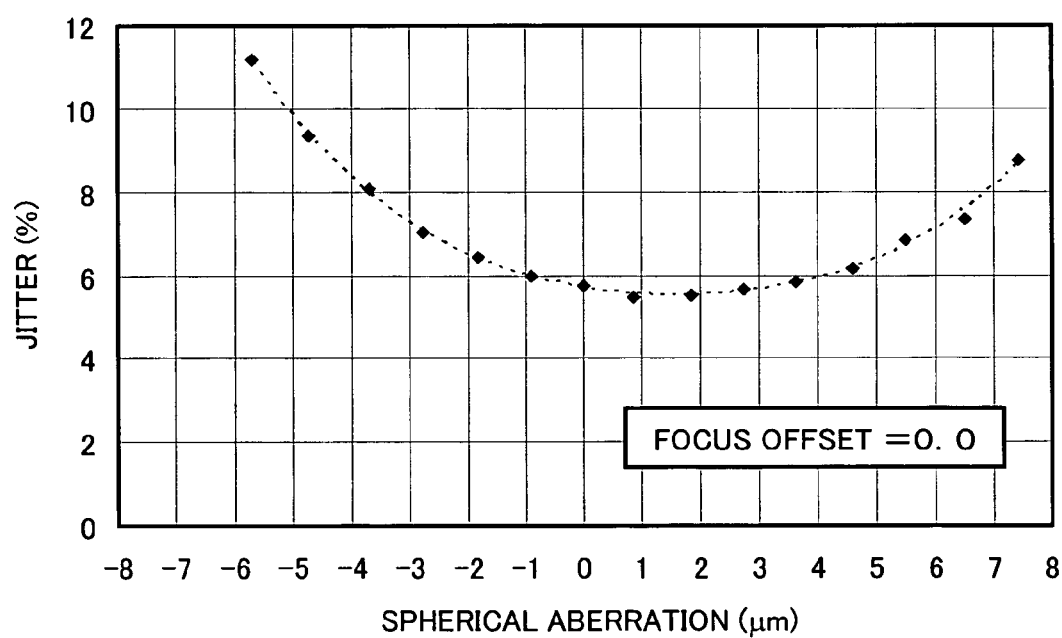
FIG. 6 is a figure showing the relationship between the spherical aberration and the jitter (experiment)

Of the five successive recording tracks that we recorded in step 12, we moved to the central recording track and measured the jitter while altering the spherical aberration. The results are shown on the graph in FIG. 6. According to these measurement results, we selected and set +0.85 µm as the spherical aberration corresponding to the minimum jitter.

(14) Step 14: Focus Fine Tuning

Figure 7:
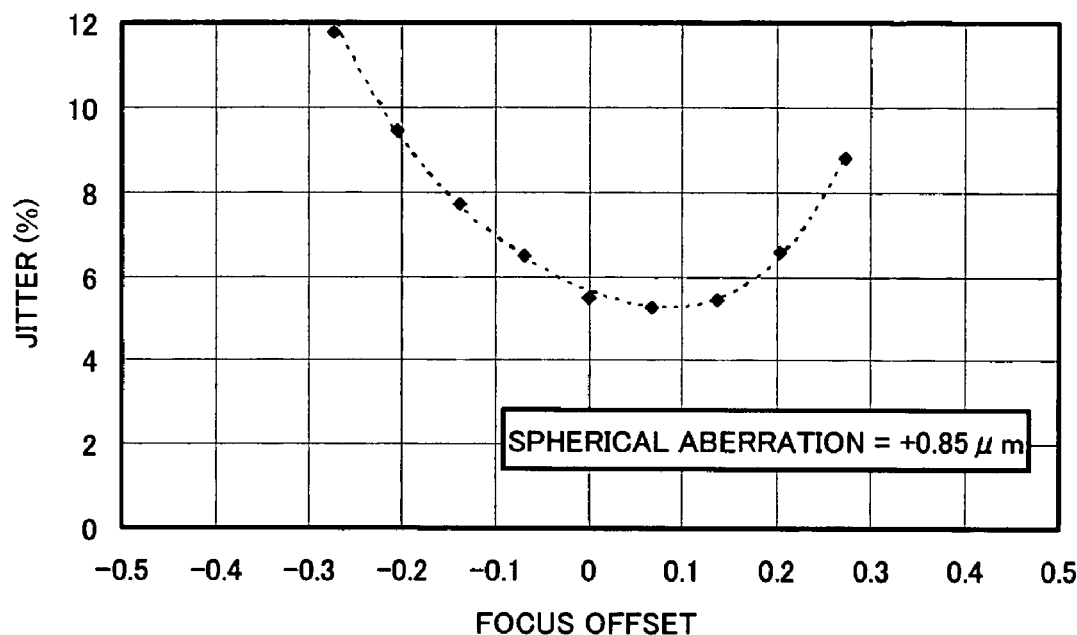
FIG. 7 is a figure showing the relationship between the focus offset and the jitter (experiment)

In the same recording track as in step 7, we measured the jitter while altering the focus offset. The results are shown on the graph in FIG. 7. According to these measurement results, we selected and set +0.068 as the focus offset corresponding to the minimum jitter.

(15) Step 15: Completion

We finished adjustment.

Following the above procedure, we eventually adjusted values to focus offset=+0.068, spherical aberration=+0.85 µm. The readout signal jitter at this time was 5.3%.

Figure 8:
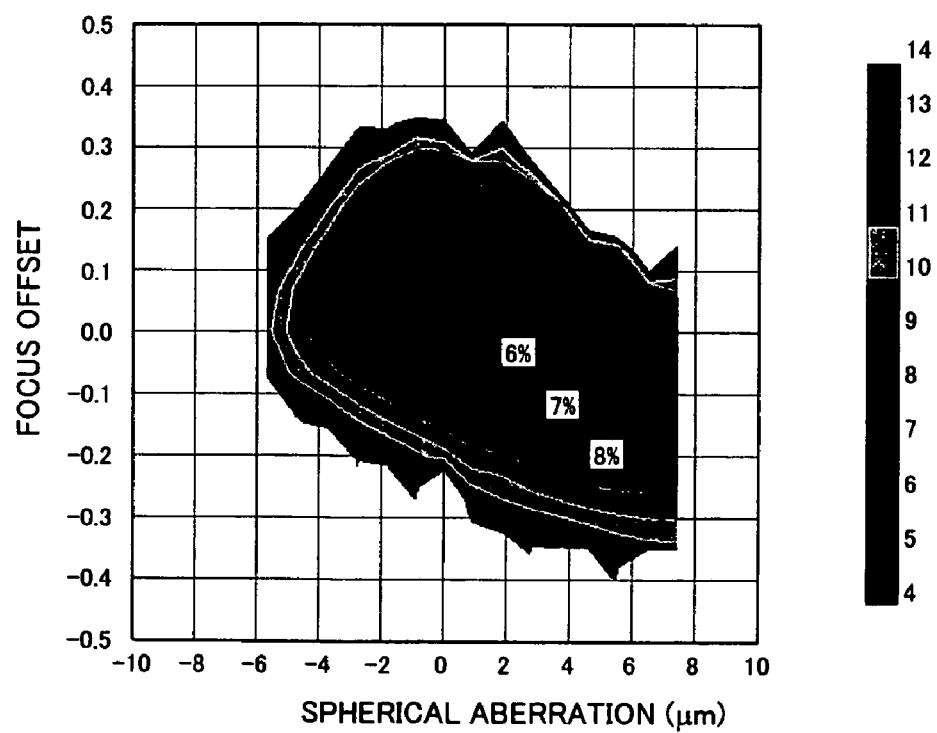
FIG. 8 is a figure showing the relationship between the focus offset and spherical aberration, and the jitter (experiment)

Next the precision of the aberration compensation procedure according to the present invention will be verified. FIG. 8 shows the contour lines plotted after measuring the readout signal jitter when the focus offset and spherical aberration were altered two-dimensionally in detail. According to these measurement results, the readout signal jitter reached a minimum when the focus offset was +0.068 and the spherical aberration was +1.85 µm, and the jitter at this time was 5.2%.

Thus, as a result of adjusting the focus offset and spherical aberration following the aberration compensation procedure according to the present invention, the difference from the conditions of minimum jitter was small: 0.0 in terms of focus offset and −1.0 µm spherical aberration, and the amount of increase from the minimum jitter was extremely small at only +0.1%. As can be seen from the above, it was confirmed that following the aberration compensation procedure according to the present invention, focus offset and spherical aberration can be adjusted with high precision.

What is claimed is:

1. An information recording and reproduction method including the steps of:

focusing light to which a spherical aberration has been added with an objective lens, and irradiating an information recording medium having a spiral-shaped or concentric recording track;

converting the light reflected on said information recording medium into an electronic signal;

generating a readout signal, tracking error signal, and focus error signal from said electronic signal; and controlling the position of said objective lens based on said tracking error signal and focus error signal, said method comprising the steps of:

determining a focus offset of the focus error signal when the jitter of said readout signal reaches a minimum, and storing the focus offset in a memory;

reading said stored focus offset from said memory; and adjusting said spherical aberration so that said tracking error signal amplitude reaches a maximum, while controlling the position of said objective lens using the focus error signal to which said read focus offset has been added;

adjusting said spherical aberration so that said readout signal jitter reaches a minimum, while controlling the position of said objective lens using the focus error signal to which said read focus offset has been added; and adjusting said focus offset so that said readout signal jitter reaches a minimum, while maintaining said adjusted spherical aberration;

determining the difference between said spherical aberration when said readout signal jitter reaches a minimum and said spherical aberration when said tracking error signal amplitude reaches a maximum, and storing said difference, while controlling the position of said objective lens using the focus error signal to which the focus offset when said readout signal jitter reaches a minimum has been added;

reading said stored difference; and altering said spherical aberration by the amount of said difference multiplied by a constant $\alpha$ ($0 \leq \alpha \leq 1$).

2. The information recording and reproduction method according to claim 1, comprising the steps of:

recording data onto at least three consecutive said recording tracks;

adjusting said spherical aberration so that the readout signal jitter of said recorded data reaches a minimum, while controlling the position of said objective lens using the focus error signal to which said read focus offset has been added; and adjusting said focus offset so that said readout signal jitter of said recorded data reaches a minimum, while maintaining said adjusted spherical aberration.

3. The information recording and reproduction method according to claim 1, wherein said tracking error signal is generated from a push-pull signal.

4. The information recording and reproduction method according to claim 1, wherein said tracking error signal is generated from a DPP (differential push-pull) signal.

5. An information recording and reproduction method including the steps of:

focusing light to which a spherical aberration has been added with an objective lens, and irradiating an information recording medium having spiral-shaped or concentric recording track;

converting the light reflected on said information recording medium into an electronic signal;

generating a readout signal, tracking error signal, and focus error signal from said electronic signal; and controlling the position of said objective lens based on said tracking error signal and focus error signal, said method comprising the steps of:

determining the focus offset of the focus error signal when said readout signal amplitude reaches a maximum, and storing the focus offset in a memory;

reading said stored offset from said memory;

adjusting said spherical aberration so that said tracking error signal amplitude reaches a maximum, while controlling the position of said objective lens using the focus error signal to which said read focus offset has been added;

adjusting said spherical aberration so that said readout signal amplitude reaches a maximum, while maintaining said stored focus offset; and adjusting said focus offset so that said readout signal amplitude reaches a maximum, while maintaining said adjusted spherical aberration;

determining the difference between said spherical aberration when said readout signal amplitude reaches a maximum and said spherical aberration when said tracking error signal amplitude reaches a maximum, and storing said difference, while controlling the position of said objective lens using the focus error signal to which the focus offset when said readout signal amplitude reaches a maximum has been added;

reading said stored difference; and altering said spherical aberration by the amount of said difference multiplied by a constant $\alpha$ ($0 \leq \alpha \leq 1$).

6. The information recording and reproduction method according to claim 5, comprising the steps of:

recording data onto at least three consecutive said recording tracks;

adjusting said spherical aberration so that said readout signal amplitude of said recorded data reaches a maximum, while controlling the position of said objective lens using the focus error signal to which said read focus offset has been added; and adjusting said focus offset so that said readout signal amplitude of said recorded data reaches a maximum, while maintaining said adjusted spherical aberration.

7. The information recording and reproduction method according to claim 5, wherein said tracking error signal is generated from a push-pull signal.

8. The information recording and reproduction method according to claim 5, wherein said tracking error signal is generated from a DPP (differential push-pull) signal.

* * * * *